(12) United States Patent
Brewer

(10) Patent No.: US 11,636,034 B2
(45) Date of Patent: *Apr. 25, 2023

(54) WRITE-BACK CACHE POLICY TO LIMIT DATA TRANSFER TIME TO A MEMORY DEVICE

(71) Applicant: Micron Technology, Inc., Boise, ID (US)

(72) Inventor: Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,949

(22) Filed: Jan. 7, 2022

(65) Prior Publication Data

US 2022/0179788 A1    Jun. 9, 2022

Related U.S. Application Data

(63) Continuation of application No. 17/114,613, filed on Dec. 8, 2020, now Pat. No. 11,249,907.

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................. G06F 12/0802; G06F 2212/60
See application file for complete search history.

(56) References Cited

U.S. PATENT DOCUMENTS

| | | | |
|---|---|---|---|
| 5,809,560 A * | 9/1998 | Schneider | G06F 12/0862 711/204 |
| 5,930,833 A | 7/1999 | Yoshioka et al. | |
| 9,213,609 B2 | 12/2015 | Hansen et al. | |
| 10,445,236 B2 | 10/2019 | Boyle | |
| 2014/0195480 A1 | 7/2014 | Talagala et al. | |
| 2016/0357656 A1 | 12/2016 | Yamamoto | |

* cited by examiner

*Primary Examiner* — Jae U Yu
(74) *Attorney, Agent, or Firm* — Brooks, Cameron & Huebsch, PLLC

(57) ABSTRACT

Systems, apparatuses, and methods related to a write-back cache policy to limit data transfer time to a memory device are described. A controller can orchestrate performance of operations to write data to a cache according to a write-back policy and write addresses associated with the data to a buffer. The controller can further orchestrate performance of operations to limit an amount of data stored by the buffer and/or a quantity of addresses stored in the buffer. In response to a power failure, the controller can cause the data stored in the cache to be flushed to a persistent memory device in communication with the cache.

20 Claims, 3 Drawing Sheets

WRITE-BACK CACHE POLICY TO LIMIT DATA TRANSFER TIME TO A MEMORY DEVICE

PRIORITY INFORMATION

This application is a Continuation of U.S. application Ser. No. 17/114,613, filed on Dec. 8, 2020, the contents of which are incorporated herein by reference.

TECHNICAL FIELD

The present disclosure relates generally to semiconductor memory and methods, and more particularly, to apparatuses, systems, and methods for a write-back cache policy to limit data transfer time to a memory device.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
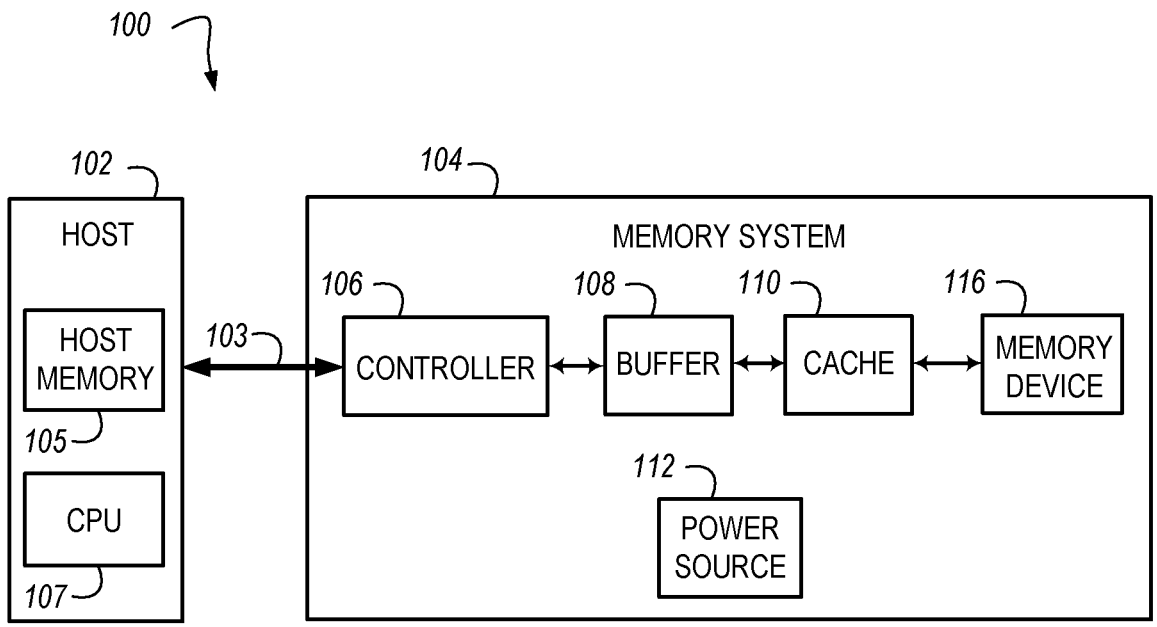
FIG. 1 is a functional block diagram in the form of a computing system including an apparatus including a memory system, which includes a controller, a buffer, a cache, a power source, and a memory device in accordance with a number of embodiments of the present disclosure.

Systems, apparatuses, and methods related to a write-back cache policy to limit data transfer time to a memory device are described. A controller can orchestrate performance of operations to write data to a cache according to a write-back policy and write addresses associated with the data to a buffer. The controller can further orchestrate performance of operations to limit an amount of data stored by the buffer and/or a quantity of addresses stored in the buffer. In response to a power failure, the controller can cause the data stored in the cache to be flushed to a persistent memory device in communication with the cache.

Memory devices may be used to store important or critical data in a computing device and can transfer such data between a host associated with the computing device and a memory system couplable to the host. As the size and quantity of data written to, and retrieved from, a memory system (e.g. a memory device associated with a memory system) increases, larger amounts of data may be "in flight" within a computing device at any given time.

In the event of a power event, such as a power failure, experienced by the computing device, data that is not written to a persistent memory device (e.g., a non-volatile memory resource) associated with the computing device can be lost. For example, data that is written to a non-persistent memory device (e.g., a volatile memory resource), such as dynamic random-access memory (DRAM), static random-access memory (SRAM), and/or various types of caches, among others, can be lost in the event of a power failure or other failure of the computing device.

As used herein, a volatile memory resource may be referred to in the alternative as a "non-persistent memory device" while a non-volatile memory resource may be referred to in the alternative as a "persistent memory device." However, a persistent memory device can more broadly refer to the ability to access data in a persistent manner. As an example, in the persistent memory context, the memory device can store logical to physical mapping or translation data and/or lookup tables in a memory array in order to track the location of data in the memory device, separate from whether the memory is non-volatile. Further, a persistent memory device can refer to both the non-volatility of the memory in addition to using that non-volatility by including the ability to service commands for successive processes (e.g., by using logical to physical mapping, look-up tables, etc.).

Due to the ever increasing size of memory devices and the ever increasing quantity of data that can be stored by a computing device, the amount of data (e.g., data that has not been committed to a persistent or non-volatile memory device) that can be lost as a result of a power failure (or other failure) of the computing device trends towards increasing over time commensurate with increases in memory device size and increases in data storage expectations.

The loss of data that has not been written (e.g., committed) to a persistent or non-volatile memory device that can occur as a result of a power (or other) failure of the computing system can cause issues to users of a computing system as well as computing resource providers. Such issues can be further exacerbated in the context of software defined data center computing architectures where multiple users and computing resource providers may be involved. Accordingly, it may beneficial to provide a mechanism by which data that has not been committed to a persistent or non-volatile memory device at the time of the power failure is written as quickly and efficiently as possible to a persistent or non-volatile memory device to mitigate the loss of data that can result from the power failure.

Some approaches attempt to address the above described issues by attempting to write data to a "save area" (e.g., a volatile non-persistent memory space) of the memory system and subsequently writing the data from the save area to a persistent or non-volatile memory device. However, such approaches can require that the data is intermediately written from the save area to a non-persistent cache in response to a power failure followed by an attempt to "flush" the cache to a persistent or non-volatile memory device within a period of time following the power failure. Although this can allow for some data that would otherwise be lost to be written to the persistent or non-volatile memory device, additional power and clock cycles may be involved in writing the data first from the save area to the cache and then from the cache to the persistent or non-volatile memory device.

Some other approaches can employ a write-through policy in committing data to a persistent or non-volatile memory device. A write-through policy, as referred to herein, is a policy in which data is written to a cache and to a persistent or non-volatile memory device essentially concurrently. Although such policies can allow for data to be committed in "real time" to the persistent or non-volatile memory device, such approaches can experience shortcomings in the event of a power failure of the computing system. For example, because data is written to both the cache and the persistent or non-volatile memory device essentially concurrently in such approaches, in the event of a power failure, the memory system may be only be able to write a small amount of the data that was intended to be written to the persistent or non-volatile memory device before any back-up power supplies are exhausted.

In contrast, embodiments described herein are directed to a memory system that includes a mechanism by which one or more caches of a memory system employ a write back policy (in comparison to a write through policy) to reduce an overall write bandwidth associated with flushing cache data to a persistent or non-volatile memory device by allowing for multiple write requests to be coalesced prior to performing a write operation to commit the data to the persistent or non-volatile memory. By coalescing the write requests prior to performing the write operation, large bursts of data (e.g., data associated with multiple write requests) may be written to the persistent or non-volatile memory, which can allow for greater data throughput to the persistent or non-volatile memory device in the event of a power failure of the computing system. This can be especially advantageous given the finite amount of time available to transfer data to a persistent or non-volatile memory device subsequent to a power failure of the computing device.

In further contrast to some approaches, embodiments described herein are directed to a memory system that can determined which portions of the cache contain "dirty" cache lines and refrain from writing addresses or data to the buffer that corresponds to such "dirty" cache lines. As used herein, the term "dirty cache line" generally refers to cache lines that contain data that has been updated since the data stored in the cache has been written to the memory device. Accordingly, embodiments herein can allow for the available size of the buffer to be effectively increased (e.g., due to not having to expend buffer resources to rewrite data corresponding to dirty cache lines to the buffer) in comparison to approaches that do not contemplate or account for data stored in the cache that has not been updated since a previous writing of the contents (or portions thereof) of the cache to the persistent or non-volatile memory device. By limiting the amount of data (e.g., addresses) that are stored in the buffer and/or by not rewriting data to the cache that is already stored therein, such embodiments can be especially advantageous in reducing the time and power used in writing data to the persistent or non-volatile memory device in the event of a power failure of the computing system.

As described in more detail herein, embodiments of the present disclosure can be facilitated by a memory system that includes a controller, a buffer (e.g., a first-in, first-out (FIFO) buffer), a cache, and a memory device. The controller can orchestrate performance of operations involving the buffer, the cache, and/or the memory device to limit a flush time associated with writing data (in particular "dirty" cache lines that contain data that has been updated since the data stored in the cache has been written to the memory device) from the cache to the memory device in the event of a power failure. For example, the controller can receive memory requests from a host and determine whether the memory requests are read requests or write requests. For received write requests, the controller can issue a write request to the cache and cause an address associated with data corresponding to the write request to be written to the buffer. As mentioned above and described herein, in some embodiments, if the controller determines that a write request corresponds to data that is already stored in the cache (e.g., a dirty cache line), the controller can refrain from writing addresses or data to the buffer that corresponds to data that is already stored in the cache to effectively increase the quantity of addresses and/or the amount of data that can be written to the buffer.

Once a quantity of addresses written to the buffer exceeds a threshold (e.g., a predetermined threshold quantity of stored addresses), in some embodiments, the data corresponding to the write requests is written to the memory device. In addition to, or in the alternative, once it is determined that an amount of data written to the cache exceeds a threshold, the contents of the cache can be written to the memory device. In some embodiments, once the threshold quantity of addresses stored in the buffer and/or the threshold quantity of data written to the cache is exceeded, the buffer and/or the cache can be granted a high data transfer priority in order to write the data to the memory device quickly to prevent the quantity of addresses written to the buffer and/or the amount of data written to the cache from further exceeding the threshold.

In some embodiments, the threshold(s) can correspond to a quantity of addresses and/or an amount of data that can be written to the memory device within a particular period of time subsequent to, for example, detection of a power failure. For example, the threshold quantity of addresses associated with the buffer can represent a maximum amount of data that can be written to the memory device in the time between detection of a power failure and the expiration of any back-up power provided to the memory system. Accordingly, as the quantity of addresses written to the buffer and/or the amount of data written to the cache approaches a respective threshold, data transfer bandwidth associated with the buffer and/or cache can be increased to allow for the quantity of addresses and/or the amount of data to be reduced below the thresholds.

In some embodiments, the memory system can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements 216-1 to 216-N may be referred to generally as 216. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including a memory system 104, which includes a controller 106, a buffer 108, a cache 110, a power source 112, and a memory device 116 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1, the memory device 116 can include one or more memory modules (e.g., single in-line memory modules, dual in-line memory modules, etc.). The memory device 116 can include volatile memory and/or non-volatile memory. In a number of embodiments, the memory device 116 can include a multi-chip device. A multi-chip device can include a number of different memory types and/or memory modules. For example, a memory system can include non-volatile or volatile memory on any type of a module.

Figure 2:
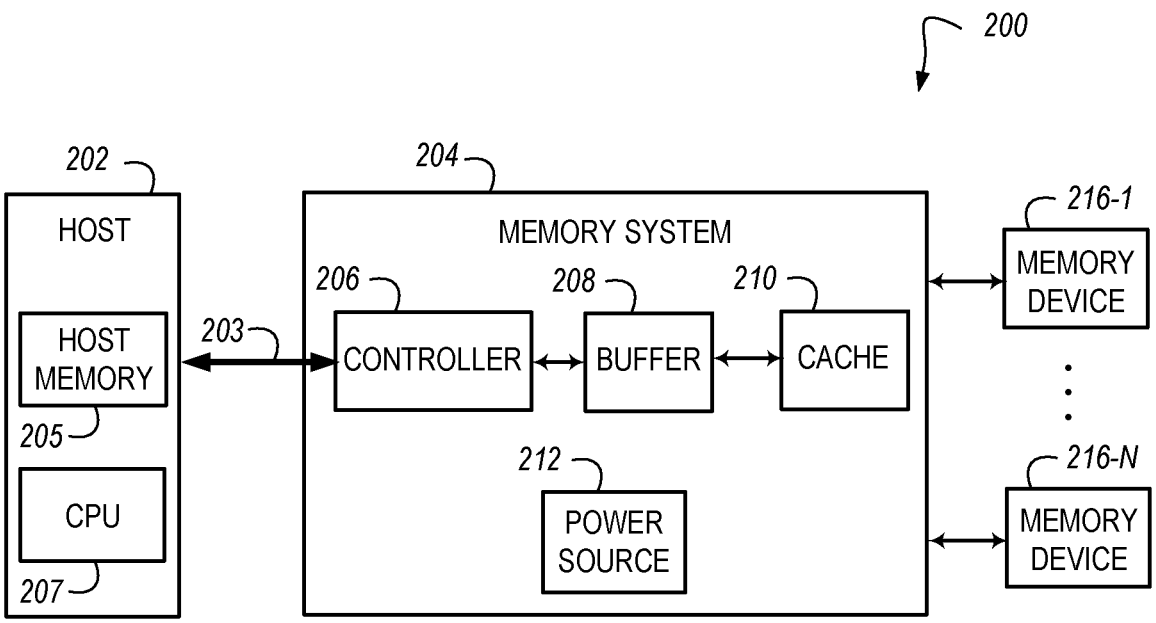
FIG. 2 is a functional block diagram in the form of a computing system including an apparatus including a memory system, which includes a controller, a buffer, a cache, a power source, and multiple memory devices in accordance with a number of embodiments of the present disclosure.

The memory device 116 can provide main memory for the computing system 100 or could be used as additional memory or storage throughout the computing system 100. The memory device 116 can include one or more arrays of memory cells, e.g., volatile and/or non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others. Although shown as a single memory device 116, it will be appreciated that multiple memory devices, such as the memory devices 216-1 to 216-N illustrated in FIG. 2, are contemplated within the scope of the disclosure.

In embodiments in which the memory device 116 includes persistent or non-volatile memory, the memory device 116 can be flash memory devices such as NAND or NOR flash memory devices. Embodiments are not so limited, however, and the memory device 116 can include other non-volatile memory devices such as non-volatile random-access memory devices (e.g., NVRAM, ReRAM, FeRAM, MRAM, PCM), "emerging" memory devices such as a ferroelectric RAM device that includes ferroelectric capacitors that can exhibit hysteresis characteristics, a 3-D Crosspoint (3D XP) memory device, etc., or combinations thereof.

As an example, a ferroelectric RAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

As another example, a 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation, where a non-volatile memory cell can be programmed without the non-volatile memory cell being previously erased.

In some embodiments, the controller 106 can be a media controller such as a non-volatile memory express (NVMe)

controller. For example, the controller 106 can be configured to perform operations such as copy, write, read, error correct, etc. for the memory device 116. In addition, the controller 106 can include special purpose circuitry and/or instructions to perform various operations described herein. That is, in some embodiments, the controller 106 can include circuitry and/or instructions that can be executed to control movement of data and/or addresses associated with data between the buffer 108, the cache 110, and/or the memory device 116. In some embodiments, circuitry and/or instructions provided to the controller 106 can control writing of data and/or addresses associated with the data to the memory device 116 in response to detection of a power failure of the computing system 100.

In some embodiments, the buffer 108 (e.g., buffer circuitry) can be a data buffer that includes a region of a physical memory storage used to temporarily store data while it is being moved from one place to another. The buffer 108 can be a first-in, first-out (FIFO) buffer in which the oldest (e.g., the first-in) data is processed first. In some embodiments, the buffer 108 can be a hardware shift register, a circular buffer, or a list.

In some embodiments, the cache 110 can include a region of a physical memory storage used to temporarily store data that is likely to be used again. The cache 110 can include a pool of data entries that have been written thereto. In some embodiments, the cache 110 can be configured to operate according to a write-back policy. As used herein, a "write-back policy" generally refers to a caching policy in which data is written to the cache 110 without the data being concurrently written to the memory device 116. Accordingly, in some embodiments, data written to the cache 110 may not have a corresponding data entry in the memory device 116 and may therefore be subject to loss in the event of a power failure of the computing system 100.

In some embodiments, the power source 112 can be a back-up power source that can be operated in the event of a power failure of the computing system 100 to provide temporary power to the memory system 104 while data is written to the memory device 116. However, the time during which the power source 112 can provide power to the memory system 104 can be relatively short. As a result, it is critical that data is written from the buffer 108 and/or the cache 110 to the memory device 116 as efficiently as possible to ensure as much data as possible is committed to the memory device 116 before all power to the memory system 104 is lost.

Accordingly, in order to facilitate transfer of all (or most) data that is not committed to the memory device 116 when a power failure occurs, embodiments herein seek to maximize data organization and data transfer efficiency by maintaining entries in the buffer 108 and/or the cache 110 such that, at any given time, all the data associated with the buffer 108 and/or the cache 110 can be transferred to the memory device 116 within the amount of time that the power source 112 can provide power to the memory system 104. For example, as described in more detail herein, the quantity of addresses written to the cache 108 and/or the amount of data written to the cache 110 can be controlled such that the quantity of addresses written to the cache 108 and/or the amount of data written to the cache 110 does not exceed a threshold that corresponds to a maximum amount of data that can be transferred to the memory device 116 within the amount of time that the power source 112 can provide power to the memory system 104.

In a non-limiting example, apparatus (e.g., the computing system 100 or the memory system 104) includes buffer circuitry (e.g., the buffer 108), a cache 110 coupled to the buffer circuitry 108, a memory device 116 coupled to the cache 108, and a controller 106 coupled to the buffer circuitry 108, the cache 110, and the memory device 116. The controller 106 can receive of write requests involving the cache 110 and cause data associated with each of the write requests to be written to the cache 110. In some embodiments, the controller 106 can receive the write requests at a rate of thirty-two (32) gigatransfers per second (e.g., in some embodiments, the controller 106 can receive the write requests according to a CXL protocol). The controller 106 can also receive read requests and cause data stored in the memory device 116 to be retrieved and written to, for example, the host 102. The cache 110 can include multiple cache lines, which can each be configured to store around sixty-four (64) bytes of data. Embodiments are not limited to this particular cache line size, however, and the cache line size can be chosen to correspond a line size associated with an external processing device such as the CPU 107.

Continuing with this example, the controller 106 can cause addresses associated with the data associated with each of the write requests to be written to the buffer circuitry 108. As described above, in some embodiments, the buffer circuitry can be a first-in, first-out (FIFO) buffer. The controller 106 can then monitor a quantity of addresses written to the buffer circuitry 108 and/or an amount of data written to the cache 110 to determine whether the buffer circuitry 108 contains greater than a threshold quantity of addresses associated with each of the write requests and/or to determine whether the cache 110 contains greater than a threshold quantity of data associated with each of the write requests. The threshold quantity of data can correspond to a particular amount of data associated with each of the write requests that is able to be flushed from the cache to the memory device within a particular amount of time subsequent to receipt of the signaling indicative of a power failure. In some embodiments, the particular amount of time can correspond to an amount of time after which power will be lost to at least one of the controller 106, the memory device 116, the cache 110, or the buffer 108, or any combination thereof.

In some embodiments, the controller 106 can determine that the quantity of addresses written to the buffer circuitry 108 contains greater than the threshold quantity of addresses associated with each of the write requests and cause at least a portion of the data written to the cache 110 to be prioritized for writing to the memory device 116 responsive to determining that the quantity of addresses written to the buffer circuitry 108 contains greater than the threshold quantity of addresses associated with each of the write operations. This can allow for the maximum amount of data stored in the cache 110 to be limited such that the amount of data stored in the cache 110 can be written to the memory device 116 within an amount of time subsequent to a power failure of the apparatus during which the power source 112 can provide back-up power to the apparatus.

The controller 106 can receive signaling indicative of a power failure experienced by the apparatus and cause the data to be written from the cache 110 to the memory device 116 responsive to receipt of the signaling indicative of the power failure. For example, in response to receipt of an indication that the apparatus has experienced a power failure, the controller 106 can cause data that is stored in the cache 110 but has not been committed to the memory device 116 to be written to the memory device 116 before back-up power to the apparatus is lost. As described above, this can allow for data that could otherwise be lost during a power failure to be stored and later recovered.

In some embodiments, the controller 106 can cause a first portion of the data written to the cache 110 to be written to the memory device 116 at a first data transfer rate for a first period of time responsive to receipt of the signaling indicative of the power failure and cause a second portion of the data written to the cache 110 to be written to the memory device 116 at a second data transfer rate for a second period of time subsequent to the first period of time. That is, in some embodiments, the controller 106 can increase the rate at which the data is written to the cache 110 subsequent to determining that a power failure has occurred to ensure that all the data stored in the cache 110 is written to the memory device 116 prior to loss of back-up power provided to the apparatus.

Embodiments are not so limited, however, and in some embodiments, the controller 106 can cause a first portion of the data written to the cache 110 to be written to the memory device 116 at a first data transfer rate for a first period of time and a second portion of the data written to the cache 110 to be written to the memory device 116 at a second data transfer rate for a second period of time subsequent to the first period of time responsive to a determination that the buffer 108 the buffer circuitry 108 contains greater than a threshold quantity of addresses associated with each of the write requests and/or a determination that the cache 110 contains greater than a threshold quantity of data associated with each of the write requests.

This can allow for other data traffic and/or memory requests associated with the memory system 104 and/or the computing system 100 to be processed in a timely manner while still allowing for a quantity of addresses stored by the buffer circuitry 108 and/or an amount of data stored by the cache 110 to remain below the thresholds described herein. For example, in some approaches, data written from the cache 110 to the memory device 116 may have a low priority such that data written from the cache 110 to the memory device 116 is written less frequently and/or at a lower data transfer rate than certain other types of data writes that involve the memory device 116.

However, in order to ensure that the amount of data stored by the cache 110 and/or the quantity of addresses stored in the buffer 108 remains below the thresholds described herein, when data write operations to commit data stored in the cache 110 to the memory device 116, embodiments herein allow for such write operations to be prioritized such that, at least for a first period of time, the data is written to the memory device 116 more frequently than normal and/or at a higher data transfer rate than normal while allowing for a reduced frequency of data transfer and/or a reduced transfer rate for a second period of time should other higher priority memory requests be received by the memory system 104. Further, some embodiments can allow for such write operations to be prioritized such that, at least for a first period of time, the data is written to the memory device 116 more frequently than normal and/or at a higher data transfer rate than normal while allowing for a further increased frequency of data transfer and/or a further increased transfer rate for a second period of time should it be determined that the cache 110 needs to be flushed even more quickly.

That is, in contrast to approaches that generally do not prioritize data writes from a cache, such as the cache 110 to the memory device 116, embodiments herein can dynamically alter the rate at which data can be written from the cache 110 to the memory device 116 in the absence of a power event or power failure responsive to a determination that the quantity of addresses written to the buffer 108 and/or the amount of data written to the cache 110 corresponds to the buffer 108 and/or the cache 110 containing greater than the threshold quantity of addresses and/or data associated with write requests. Accordingly, embodiments described herein can allow for the rate at which data can be written from the cache 110 to the memory device 116 in the absence of a power event or power failure to be controlled to allow for efficient transfer of data from the cache 110 to the memory device 116 as necessary while balancing efficient transfer of other memory requests within the computing system 100.

As illustrated in FIG. 1, a host 102 can be coupled to the memory system 104 via an interface 103. The interface 103 can be any type of communication path, bus, or the like that allows for information to be transferred between the host 102 and the memory system 104. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. However, in at least one embodiment, the interface 103 is a PCIe 5.0 interface that is compliant with the compute express link (CXL) protocol standard. Accordingly, in some embodiments, the interface 103 can support transfer speeds of at least 32 gigatransfers per second.

In some embodiments, the interface 103 can be configured such that signaling can be selectively transferred via the interface 103 according to multiple protocols. For example, signaling can be selectively transferred via the interface 103 according a cache protocol in which data is transferred between a host and the memory system 104 and a memory protocol in which data is transferred between a host and the memory device 116. In some embodiments, the cache protocol can be invoked to efficiently cache data associated with the host memory 105 according to a request and response approach. In contrast, the memory protocol can be invoked to provide access to the memory device 116 by the host using read/write command with the host processor (e.g., the CPU 107) acting as a master device and the memory device 116 acting as a subordinate device.

In a number of embodiments, the memory device 116 can be resident on the memory system 104, however, embodiments are not so limited and, in some embodiments, the memory device 116 can be external to the memory system 104, as shown in FIG. 2. Further, although a single memory device 116 is illustrated in FIG. 1, more than one memory device can be included in the computing system 100, as illustrated in FIG. 2. As used herein, the term "resident on" refers to something that is physically located on a particular component. For example, the memory device 116 being "resident on" the memory system 104 refers to a condition in which the memory device 116 is physically within the memory system 104. The term "resident on" may be used interchangeably with other terms such as "deployed on" or "located on," herein.

The host 102 can include host memory 105 and a central processing unit (CPU) 107. The host 102 can be a host system such as a personal laptop computer, a desktop computer, a digital camera, a smart phone, a memory card reader, and/or internet-of-thing enabled device, among various other types of hosts, and can include a memory access device, e.g., a processor (or processing device). One of ordinary skill in the art will appreciate that "a processor" can intend one or more processors, such as a parallel processing system, a number of coprocessors, etc.

The host 102 can include a system motherboard and/or backplane and can include a number of processing resources (e.g., one or more processors, microprocessors, or some other type of controlling circuitry). The system 100 can include separate integrated circuits or the host 102, the memory system 104 the controller 106, the buffer 108, the cache 110, the power source 112, and the memory device 116 can be on the same integrated circuit. The system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

The embodiment of FIG. 1 can include additional circuitry that is not illustrated so as not to obscure embodiments of the present disclosure. For example, the storage controller 104 can include address circuitry to latch address signals provided over I/O connections through I/O circuitry. Address signals can be received and decoded by a row decoder and a column decoder to access the memory device 116. It will be appreciated by those skilled in the art that the number of address input connections can depend on the density and architecture of the memory device 116.

FIG. 2 is a functional block diagram in the form of a computing system 200 including an apparatus including a memory system 204, which includes a controller 206, a buffer 208, a cache 210, a power source 212, and multiple memory devices 216-1 to 216-N in accordance with a number of embodiments of the present disclosure. The computing system 200 can be analogous to the computing system 100 illustrated in FIG. 1. Accordingly, the memory system 204, the controller 206, the buffer 208, the cache 210, and/or the power source 212 can be analogous to the memory system 104, the controller 106, the buffer 108, the cache 110, and/or the power source 112 illustrated in FIG. 1.

In FIG. 2, multiple memory devices 216-1 to 216-N are illustrated. At least one of the memory devices 216-1 to 216-N can be analogous to the memory device 116 illustrated in FIG. 1. For example, at least one of the memory devices 216-1 to 216-N can be an "emerging" memory device, as described above. In embodiments that include multiple memory devices 216-1 to 216-N, the controller 206 can selectively determine which of the memory devices 216-1 to 216-N to transfer data associated with the addresses written to the buffer 208 and/or data written to the cache 210 in the event of a power failure of the computing system 200.

In a non-limiting example, a system, such as the computing system 200 or the memory system 204 can include first-in, first-out (FIFO) buffer circuitry (e.g., the buffer 208), a cache 210 coupled to the FIFO buffer circuitry, a persistent memory device (e.g., at least one of the memory devices 216-1 to 216-N) coupled to the cache 210, and a controller 206 coupled to the FIFO buffer circuitry, the cache 210, and the memory device 216. Continuing with this example, the controller 206 can receive one or more write requests involving the cache 210 and cause data associated with each of the plurality of write requests to be written to the cache 210. Further, the controller 206 can cause addresses associated with the data associated with each of the write requests to be written to the FIFO buffer circuitry.

In some embodiments, the controller 206 can monitor a quantity of addresses written to the FIFO buffer circuitry or an amount of data written to the cache, or both, to determine whether the FIFO buffer circuitry contains greater than a threshold quantity of addresses associated with each of the write requests and/or whether the cache 210 contains greater than a threshold quantity of data associated with each of the write requests. The controller 206 can further cause at least a portion of the data written to the cache 210 to be prioritized for writing to the persistent memory device responsive to determining that the quantity of addresses written to the FIFO buffer circuitry contains greater than the threshold quantity of addresses associated with each of the write operations and/or that the cache contains greater than a threshold quantity of data associated with each of the write requests.

In some embodiments, the controller 206 can determine that particular data previously written to the cache 210 corresponds to data associated with at least one of the write requests and refrain from writing an address corresponding to the particular data previously written to the cache 210 to the buffer based 208, at least in part, on the determination. That is, in some embodiments, the controller 206 can determine that an address that corresponds to a cache line that been overwritten by an intervening write request is already stored in the buffer 208 and refrain from re-writing a corresponding address to the buffer 208. This can effectively increase the available size of the buffer 208 and can further reduce power consumption and/or improve performance of a computing system in comparison to approaches that do not employ the concepts described herein. In addition, time spent in writing the addresses to the buffer 208 and/or power consumed in writing addresses to the buffer 208 can be reduced in comparison to approaches that fail to account for whether or not an address corresponding to a line of the cache 210 is already stored in the buffer 208.

As described above, in some embodiments, the controller 206 can receive signaling indicative of a power failure experienced by the apparatus and cause the data to be written from the cache 210 to the persistent memory device responsive to receipt of the signaling indicative of the power failure. The controller 206 can, in some embodiments, cause a first portion of the data written to the cache 210 to be written to the persistent memory device at a first data transfer rate for a first period of time responsive to receipt of the signaling indicative of the power failure and cause a second portion of the data written to the cache 210 to be written to the persistent memory device at a second data transfer rate for a second period of time subsequent to the first period of time.

In some embodiments, the threshold quantity of addresses can correspond to a particular amount of data associated with each of the write requests that are able to be flushed from the cache 210 to the persistent memory device within a particular amount of time subsequent to receipt of the signaling indicative of the power failure. Further, in some embodiments, the threshold quantity of data associated with each of the write requests can correspond to a particular amount of data that are able to be flushed from the cache 210 to the persistent memory device within a particular amount of time subsequent to receipt of the signaling indicative of the power failure. Further, in some embodiments, the particular amount of time can correspond to an amount of time after which power will be lost to at least one of the controller 206, the persistent memory device, the cache 210, or the FIFO buffer circuitry, or any combination thereof.

Continuing with this example, the system can include a host 202 system couplable to the controller 206. In some embodiments, the cache 210 can include one or more cache lines that can each be aligned to a cache line size corresponding to the host 202 system. In some embodiments, the system can further include a peripheral component interconnect express (PCIe) 5.0 interface (e.g., the interface 203 coupled to the controller 206. In such embodiments, the controller 206 can receive the write requests involving the cache 210 via the PCIe 5.0 interface according to a compute express link protocol.

Figure 3:
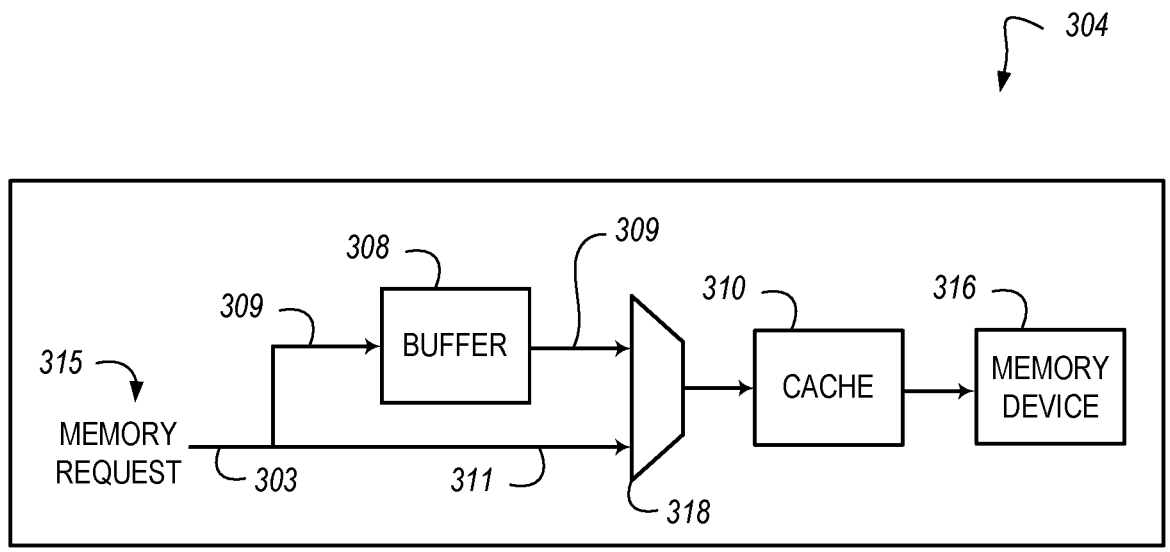
FIG. 3 is functional block diagram in the form of a memory system including a buffer, a cache, and a memory device in accordance with a number of embodiments of the present disclosure.

FIG. 3 is functional block diagram in the form of a memory system 304 including a buffer 308, a cache 310, and a memory device 316 in accordance with a number of embodiments of the present disclosure. The memory system 304, the buffer 308, the cache 310, and the memory device 316 can be analogous to the memory system 104/204, the buffer 108/208, the cache 110/210, and the memory device 116/216 illustrated in FIGS. 1 and 2, herein. Although shown as a single memory device 316, it will be appreciated that multiple memory devices, such as the memory devices 216-1 to 216-N illustrated in FIG. 2, are contemplated within the scope of the disclosure. As shown in FIG. 3, the memory system 304 can further include a data selector 318.

A memory request 315 can be received by the memory system 304. The memory request can be a read request (e.g., a request to retrieve data stored by the memory device 316) or a write request (e.g., a request to write data to the memory device 316). In some embodiments, the memory request 315 is received from circuitry external to the memory system 304, such as from a host (e.g., the host 102/202 illustrated in FIGS. 1 and 2, herein). The memory request 315 can be received via an interface 303, which can be analogous to the interface 103/203 illustrated in FIGS. 1 and 2, herein.

In some embodiments, the interface 303 can be configured such that signaling can be selectively transferred via the interface 303 according to multiple protocols. For example, signaling can be selectively transferred via the interface 303 according a cache protocol in which data is transferred between a host and the memory system 304 and a memory protocol in which data is transferred between a host and the memory device 316. In some embodiments, the cache protocol can be invoked to efficiently cache host memory (e.g., data associated with the host memory 105/205 illustrated in FIGS. 1 and 2, herein) according to a request and response approach. In contrast, the memory protocol can be invoked to provide access to the memory device 316 by the host using read/write command with the host processor (e.g., the CPU 107/207 illustrated in FIGS. 1 and 2, herein) acting as a master device and the memory device 316 acting as a subordinate device.

In some embodiments, the memory request 315 can be received via the interface 303 and selectively diverted to the buffer 308 via the communication path 309 or the memory request 315 can be selectively diverted to the memory device 316 via the cache 318 via the communication path 311. In a non-limiting example, the communication path 309 can represent that signaling indicative of a cache protocol has been transferred (e.g., from the host) via the interface 303 while the communication path 311 can represent that signaling indicative of a memory protocol has been transferred (e.g., from the host) via the interface 303.

Embodiments are not so limited, however, and in some embodiments, signaling indicative of a write request can be selectively diverted via the communication path 309, while signaling indicative of a read request can be selectively diverted via the communication path 311. However, in some embodiments, signaling indicative of a write-back operation can be selectively diverted via the communication path 309 to the buffer 308 and/or the cache 310, while signaling indicative of a write-through operation can be selectively diverted to the cache 310 and/or the memory device 316 via the communication path 311.

The signaling received as part of receipt of the memory request 315 can be received by a controller (e.g., the controller 106/206 illustrated in FIGS. 1 and 2, herein) from the host. Accordingly, the controller can process the memory request 315 to cause the memory request 315 to be selectively diverted to the communication path 309 or the communication path 311 based on characteristics of the memory request 315. Such characteristics can include whether the memory request 315 involves a read request, a write request, a write-through operation, and/or a write-back operation, among other characteristics associated with the memory request 315.

In embodiments in which the memory request 315 corresponds to a write request, the controller can cause data associated with the write request to be written to the cache 310 without writing the data to the memory device 316. In addition, the controller can cause an address associated with the data corresponding to the write request to be written to the buffer 308. As more write requests are processed and written to the cache 310 (and corresponding addresses are written to the buffer 308), the total quantity of addresses written to the buffer 308 and/or the total amount of data written to the cache 310 can be monitored.

As described above, a threshold maximum total quantity of addresses written to the buffer 308 and/or a threshold maximum total amount of data written to the cache 310 can be set and the total quantity of addresses written to the buffer 308 and/or the total amount of data written to the cache 310 can be monitored to ensure that total quantity of addresses written to the buffer 308 and/or the total amount of data written to the cache 310 do not exceed the threshold maximum total quantity of addresses written to the buffer 308 and/or the threshold maximum total amount of data written to the cache 310.

If the threshold maximum total quantity of addresses written to the buffer 308 and/or the threshold maximum total amount of data written to the cache 310 is exceeded (or is nearly exceeded), the data stored in the cache 310 can be written to the memory device 316 to free up space in the cache 310. In some embodiments, the transfer of data from the cache 310 to the memory device 316 in response to the threshold maximum total quantity of addresses written to the buffer 308 and/or the threshold maximum total amount of data written to the cache 310 being exceeded (or nearly exceeded) can be prioritized over other incoming or outgoing data traffic to ensure that the cache 310 is evacuated quickly and/or efficiently. Once the data (or a predetermined percentage of the data) has been written from the cache 310 to the memory device 316, the writing of data from the cache 310 to the memory device 316 can be de-prioritized and normal data transfer rates within the memory system 304 can be utilized.

By limiting the maximum total quantity of addresses written to the buffer 308 and/or the maximum total amount of data written to the cache 310 at any given time in such a manner, it can be ensured that all the data written to the cache 310 can be written to the memory device 316 in the event of a power event (e.g., a power failure) experienced by the memory system 304. That is, by maintaining the maximum total quantity of addresses written to the buffer 308 and/or the maximum total amount of data written to the cache 310 such that it is below the threshold maximum total quantity of addresses written to the buffer 308 and/or the threshold maximum total amount of data written to the cache 310 at any given time, it can be ensured that the data written to the cache 310 can be written to the memory device 316 within an amount of time that back-up power can be provided to the memory system 304 in the event of a power failure. As described above, the back-up power can be supplied to the memory device by a power source such as the power source 112/212 illustrated in FIGS. 1 and 2, herein.

As described earlier, the buffer 308 can be a first-in, first-out buffer. Accordingly, when the threshold maximum total quantity of addresses written to the buffer 308 and/or the threshold maximum total amount of data written to the cache 310 is exceeded (or is nearly exceeded), data corresponding to the earlies addresses written to the buffer 308 can be processed first. As a result, in some embodiments, data written to the cache 310 that has been stored in the cache 310 for the longest period of time can be written to the memory device 316 first, with the second oldest data being written to the memory device 316 second, and so forth.

Figure 4:
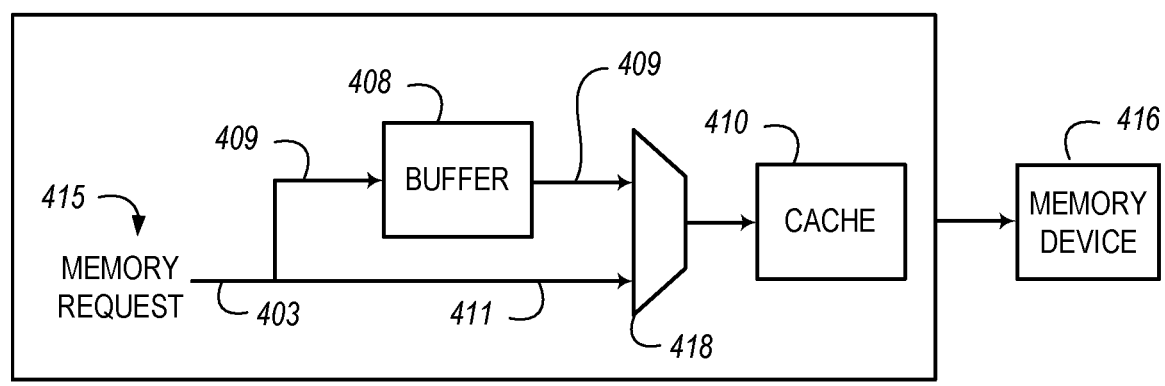
FIG. 4 is another functional block diagram in the form of a memory system including a buffer, a cache, and a memory device in accordance with a number of embodiments of the present disclosure.

FIG. 4 is another functional block diagram in the form of a memory system 404 including a buffer 408, a cache 410, and a memory device 416 in accordance with a number of embodiments of the present disclosure. The memory system 404, the buffer 408, the cache 410, and the memory device 416 can be analogous to the memory system 104/204/304, the buffer 108/208/308, the cache 110/210/310, and the memory device 116/216/316 illustrated in FIGS. 1-3, herein. Although shown as a single memory device 416, it will be appreciated that multiple memory devices, such as the memory devices 216-1 to 216-N illustrated in FIG. 2, are contemplated within the scope of the disclosure. As shown in FIG. 4, the memory system 404 can further include a data selector 418, which can be analogous to the data selector 318 illustrated in FIG. 3, herein. Further, the communication paths 409 and 411 can be analogous to the communication paths 309 and 311 illustrated in FIG. 3.

As shown in FIG. 4, the memory device 416 can be external to the memory system 404 (similar to the memory devices 216-1 to 216-N described above in connection with FIG. 2). Accordingly, in general, the operations performed by the memory system 404 illustrated in FIG. 4 are commensurate with those described in connection with the operations performed by the memory system 104/204/304 described above in connection with FIGS. 1-3, while the operations performed by the memory device 416 are commensurate with those described in connection with the operations performed by the memory device(s) 116/216/316 described above in connection with FIGS. 1-3.

Figure 5:
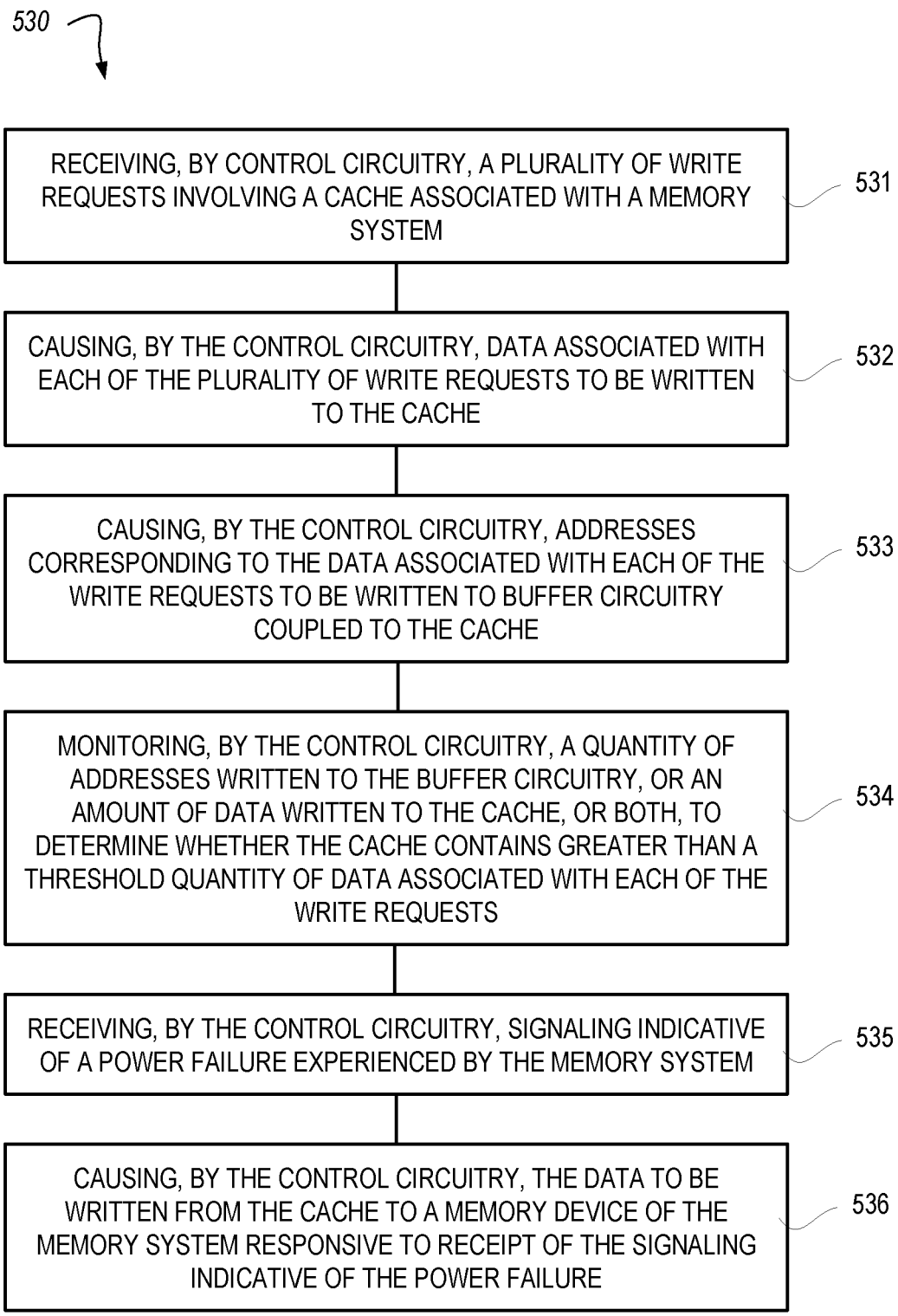
FIG. 5 is a flow diagram representing an example method for a write-back cache policy to limit data transfer time to a memory device in accordance with a number of embodiments of the present disclosure.

FIG. 5 is flow diagram representing an example method 530 for a write-back cache policy to limit data transfer time to a memory device in accordance with a number of embodiments of the present disclosure. The method 530 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 530 is performed by the controller 106 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 531, the method 530 can include receiving, by a controller, a plurality of write requests involving a cache associated with a memory system. The controller can be analogous to the controller 106/206 illustrated in FIGS. 1 and 2, herein, while the cache can be analogous to the cache 110/210/310/410 illustrated in FIGS. 1-4, herein. The memory system can be analogous to the memory system 104/204/304/404 illustrated in FIGS. 1-4, herein. In some embodiments, the plurality of write requests can be received by the controller via a compute express link compliant interface, such as the interface 103/203 illustrated in FIGS. 1 and 2, herein.

At block 532, the method 530 can include causing, by the controller, data associated with each of the plurality of write requests to be written to the cache. The data can, in some embodiments, be written to the cache according to a write-back policy in which the data is written to the cache without concurrently writing the data to the memory device.

At block 533, the method 530 can include causing, by the controller, addresses corresponding to the data associated with each of the write requests to be written to buffer circuitry coupled to the cache. The buffer circuitry can be analogous to the buffer 108/208/308/408 illustrated in FIGS. 1-4, herein.

At block 534, the method 530 can include monitoring, by the controller, a quantity of addresses written to the buffer circuitry and/or an amount of data written to the cache to determine whether the cache contains greater than a threshold quantity of data associated with each of the write requests.

At block 535, the method 530 can include receiving, by the controller, signaling indicative of a power failure experienced by the memory system. In some embodiments, receipt of the signaling indicative of the power failure can cause a memory system (e.g., the memory system 104/204/304/404 illustrated in FIGS. 1-4, herein) coupled to the controller to enter a back-up power mode in which power is temporarily supplied to the memory system by an internal power source such as the power source 112/212 illustrated in FIGS. 1 and 2, herein.

At block 536, the method 530 can include causing, by the controller, the data to be written from the cache to a memory device of the memory system responsive to receipt of the signaling indicative of the power failure. The memory device can be analogous to the memory device 116/216/316/416 illustrated in FIGS. 1-4, herein. In some embodiments, the quantity of addresses written to the buffer circuitry and/or the threshold quantity of data associated with each of the write requests can correspond to a particular amount of data that are able to be flushed from the cache to the memory device within a particular amount of time subsequent to receipt of the signaling indicative of the power failure. The particular amount of time can correspond to an amount of time after which power will be lost to at least one of the controller, the memory device, the memory system, the cache, or the buffer circuitry, or any combination thereof.

In some embodiments, the method 530 can include determining that the quantity of addresses written to the buffer circuitry and/or the amount of data written to the cache corresponds to the cache containing greater than the threshold quantity of data associated with each of the write requests and causing at least a portion of the data written to the cache to be prioritized for writing to the memory device responsive to the determination. In some embodiments, the method 530 can further include determining, by the controller, that particular data previously written to the cache corresponds to data associated with at least one of the plurality of write requests and/or refraining from writing an address corresponding to the particular data previously written to the cache to the buffer circuitry based, at least in part, on the determination.

By refraining from rewriting addresses to the buffer that correspond to data that has previously written to the cache (e.g., by refraining from updating dirty cache lines and/or by overwriting dirty cache lines with newly written data), embodiments herein can effectively increase the available size of the buffer, thereby reducing power consumption and/or improving performance of the computing system in comparison to approaches that do not employ the concepts described herein. In addition, time spent in writing the addresses to the buffer and/or power consumed in writing addresses to the buffer can be reduced in comparison to approaches that fail to account for whether or not the cache contains dirty data and selectively write addresses to the cache based on such information.

The method 530 can also include causing, by the controller, a first portion of the data written to the cache to be written to the memory device at a first data transfer rate for a first period of time responsive to receipt of the signaling indicative of the power failure and causing, by the controller, a second portion of the data written to the cache to be written to the memory device at a second data transfer rate for a second period of time subsequent to the first period of time. In some embodiments, the second data transfer rate can be greater then the first data transfer rate to ensure that the buffer does not become overrun with addresses, thereby eliminating the possibility that data stored in the cache is lost.

In a non-limiting example, a method can include receiving, by a controller (e.g., the controller 106/206 illustrated in FIGS. 1 and 2, herein), a plurality of memory requests involving a cache (e.g., the cache 110/210/310/410 illustrated in FIGS. 1-4, herein) of a memory system (e.g., the memory system 104/204/304/404 illustrated in FIGS. 1-4, herein) and determining, by the controller, whether respective memory requests among the plurality of memory requests corresponds to a write operation or a read operation. Such methods can further include causing, by the controller, writing of respective addresses associated with each memory request that corresponds to a determined write operation to a buffer (e.g., the buffer 108/208/308/408 illustrated in FIGS. 1-4, herein) coupled to the cache and monitoring, by the controller, an amount of data written to the cache that corresponds to the respective addresses associated with each memory request that corresponds to the determined write operation written to the buffer to determine whether the cache contains greater than a threshold quantity of data associated with each respective memory request that corresponds to the determined write operation.

In some embodiments, an amount of data corresponding to the threshold quantity of addresses associated with each memory request that corresponds to the write operations corresponds to a particular quantity of data written to the cache that is available to be flushed to the memory device within a particular amount of time subsequent to receipt of the signaling indicative of the power event experienced by the memory system. Further, in some embodiments, the particular amount of time corresponds to an amount of time after which power will be lost to at least one of the controller, the memory system, the cache, or the memory device, or any combination thereof.

Continuing with this non-limiting example, a method in accordance with the disclosure can further include receiving, by the controller, signaling indicative of a power event experienced by the memory system and causing, by the controller, data corresponding to the respective addresses associated with each respective memory request that corresponds to the determined write operations to be written from the cache to a memory device couplable to the cache responsive to receipt of the signaling indicative of the power event. In some embodiments, the method can include receiving, by the controller, signaling indicative of a power failure of the memory system as part of receiving the signaling indicative of the power event experienced by the memory system.

Such methods can further include determining, by the controller, that an amount of data corresponding to the quantity of addresses written to the cache contains greater than the threshold quantity of addresses associated with each respective memory request that corresponds to the determined write operations and causing, by the controller, at least a portion of the data corresponding to the addresses written to the buffer to be prioritized for writing from the cache to the memory device responsive to determining that the amount of data corresponding to the quantity of addresses written to the buffer contains greater than the threshold quantity of addresses associated with each memory request that corresponds to the write operations.

Further, such methods can include determining, by the controller, that particular data previously written to the cache corresponds to data associated with at least one write request and/or refraining from writing an address corresponding to the particular data previously written to the cache to the buffer circuitry based, at least in part, on the determination. Embodiments are not so limited, however, and in some embodiments such methods can include causing, by the controller, the data corresponding to the respective addresses associated with each memory request that corresponds to the write operations to be written from the cache to the memory device at a first data transfer rate for a first period of time responsive to receipt of the signaling indicative of the power event and causing, by the controller, the data corresponding to the respective addresses associated with each memory request that corresponds to the write operations to be written from the cache to the memory device at a second data transfer rate for a second period of time subsequent to the first period of time.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   writing data associated with each of a plurality of write requests to a cache of a memory system;
   writing addresses corresponding to the data associated with the plurality of write requests to buffer circuitry coupled to the cache;
   monitoring a quantity of addresses written to the buffer circuitry, or an amount of data written to the cache, or both, to determine whether the cache contains greater than a threshold quantity of data associated with the plurality of write requests; and
   writing the data from the cache to a memory device of the memory system responsive to a determination that the memory system has experienced a power event.

2. The method of claim 1, further comprising:
   determining that the quantity of addresses written to the buffer circuitry or the amount of data written to the cache, or both, corresponds to the cache containing greater than the threshold quantity of data associated with the plurality of write requests; and
   prioritizing writing of at least a portion of the data written to the cache to the memory device responsive to the determination.

3. The method of claim 1, further comprising:
   determining that the quantity of addresses written to the buffer circuitry or the amount of data written to the cache, or both, corresponds to the cache containing greater than the threshold quantity of data associated with the plurality of write requests;
   writing a first portion of the data written to the cache to the memory device at a first data transfer rate for a first period of time responsive to determining that the quantity of addresses written to the buffer circuitry or the amount of data written to the cache, or both, corresponds to the cache containing greater than the threshold quantity of data associated with the plurality of write requests; and
   writing a second portion of the data written to the to the memory device at a second data transfer rate for a second period of time subsequent to the first period of time.

4. The method of claim 1, wherein the quantity of addresses written to the buffer circuitry or the threshold quantity of data associated with the plurality of write requests, or both, corresponds to an amount of data that are able to be transferred from the cache to the memory device within a particular amount of time subsequent to the determination that the memory system has experienced the power event.

5. The method of claim 4, wherein the particular amount of time corresponds to an amount of time after which power will be lost to at least one of the memory device, the memory system, the cache, or the buffer circuitry, or any combination thereof.

6. The method of claim 1, further comprising:
   determining that data previously written to the cache corresponds to data associated with at least one of the plurality of write requests; and
   refraining from writing an address corresponding to the data previously written to the cache to the buffer circuitry based, at least in part, on the determination.

7. The method of claim 1, wherein the memory system is a compute express link (CXL) compliant memory system and wherein the plurality of write requests are received via a compute express link compliant interface.

8. An apparatus, comprising:
   buffer circuitry;
   a cache coupled to the buffer circuitry;
   a memory device coupled to the cache; and
   a controller coupled to the buffer circuitry, the cache, and the memory device, wherein the controller is configured to:
      write data associated with a plurality of memory requests to the cache;
      write addresses associated with the data associated with the plurality of memory requests to the buffer circuitry;
      determine whether the buffer circuitry contains greater than a threshold quantity of addresses associated with the plurality of memory requests, or the cache contains greater than a threshold quantity of data associated with the plurality of memory requests, or both; and
      write the data from the cache to the memory device responsive to a determination that the memory device has experienced a power event.

9. The apparatus of claim 8, wherein the controller is configured to:
   determine that the quantity of addresses written to the buffer circuitry contains greater than the threshold quantity of addresses associated with the plurality of memory requests; and
   prioritize writing of at least a portion of the data written to the cache to the memory device responsive to determining that the quantity of addresses written to the buffer circuitry contains greater than the threshold quantity of addresses associated with the plurality of memory requests.

10. The apparatus of claim 8, wherein the cache comprises a plurality of cache lines, and wherein each of the cache lines comprises around sixty-four bytes.

11. The apparatus of claim 8, wherein the device is a compute express link compliant memory device.

12. The apparatus of claim 8, wherein the write requests are received by the controller at a rate of around thirty-two (32) gigatransfers per second.

13. The apparatus of claim 8, wherein the threshold quantity of data associated with the plurality of memory requests corresponds to an amount of data that is able to be transferred from the cache to the memory device within a particular amount of time subsequent to the determination that the memory device has experienced the power event.

14. The apparatus of claim 8, wherein the controller is configured to:
   write a first portion of the data written to the cache to the memory device at a first data transfer rate for a first period of time responsive to determining that the quantity of addresses written to the buffer circuitry or the amount of data written to the cache, or both, corresponds to the cache containing greater than the threshold quantity of data associated with the plurality of memory requests; and
   write a second portion of the data written to the cache to the memory device at a second data transfer rate for a second period of time subsequent to the first period of time.

15. The apparatus of claim 8, wherein the controller is configured to:

determine that data previously written to the cache corresponds to data associated with at least one of the plurality of memory requests; and refrain from writing an address corresponding to the data previously written to the cache to the buffer based, at least in part, on the determination.

16. A system, comprising:

buffer circuitry;

a cache coupled to the buffer circuitry;

a memory device coupled to the cache; and a controller coupled to the buffer circuitry, the cache, and the memory device, wherein the controller is configured to:
- write data associated with a plurality of memory requests to the cache;
- write addresses corresponding to the data associated with the plurality of memory requests to the buffer circuitry;
- determine whether the buffer circuitry contains greater than a threshold quantity of addresses associated with the plurality of memory requests or whether the cache contains greater than a threshold quantity of data associated with the plurality of memory requests, or both;
- cause at least a portion of the data written to the cache to be prioritized for writing to the memory device responsive to a determination that the quantity of addresses written to the buffer circuitry contains greater than the threshold quantity of addresses associated with the plurality of memory operations or responsive to a determination that the cache contains greater than a threshold quantity of data associated with the plurality of memory requests, or both; and
- write the data from the cache to the memory device responsive to receipt of signaling indicative of a power event experienced by the system.

17. The system of claim 16, wherein the controller is configured to:

determine that particular data previously written to the cache corresponds to data associated with at least one of the plurality of memory requests; and refrain from writing an address corresponding to the particular data previously written to the cache to the buffer circuitry based, at least in part, on the determination.

18. The system of claim 16, wherein:

the threshold quantity of data associated with the plurality of write requests corresponds to a particular amount of data that are able to be transferred from the cache to the memory device within a particular amount of time subsequent to receipt of the signaling indicative of the power event, and the particular amount of time corresponds to an amount of time after which power will be lost to at least one of the controller, the memory device, the cache, or the buffer circuitry, or any combination thereof.

19. The system of claim 16, further comprising a host system couplable to the controller, wherein:

the cache comprises a plurality of cache lines, and each of the cache lines is aligned to a cache line size corresponding to the host system.

20. The system of claim 16, further comprising a peripheral component interconnect express (PCIe) 5.0 or greater interface coupled to the controller, wherein the controller is configured to receive the plurality of memory requests via the PCIe 5.0 interface according to a compute express link protocol.

* * * * *